US012618518B2

(12) United States Patent
Frenz et al.

(10) Patent No.: US 12,618,518 B2
(45) Date of Patent: May 5, 2026

(54) CAP FOR A PRESSURE TANK, AND PRESSURE TANK FOR A GAS-POWERED VEHICLE

(71) Applicant: Voith HySTech GmbH, Garching (DE)

(72) Inventors: Hartmut Frenz, Donzdorf (DE); Lukas Wessels, Aying (DE); Mark Bleischwitz, Munich (DE); Thomas Lanzl, Wald (DE)

(73) Assignee: Voith HySTech GmbH, Garching (DE)

( * ) Notice: Subject to any disclaimer, the term of this patent is extended or adjusted under 35 U.S.C. 154(b) by 291 days.

(21) Appl. No.: 18/258,881

(22) PCT Filed: Dec. 3, 2021

(86) PCT No.: PCT/EP2021/084093
§ 371 (c)(1),
(2) Date: Jun. 22, 2023

(87) PCT Pub. No.: WO2022/135872
PCT Pub. Date: Jun. 30, 2022

(65) Prior Publication Data

US 2025/0264189 A1 Aug. 21, 2025

(30) Foreign Application Priority Data

Dec. 22, 2020 (DE) ..................... 10 2020 134 624.7

(51) Int. Cl.
*F17C 1/16* (2006.01)

(52) U.S. Cl.
CPC ........ *F17C 1/16* (2013.01); *F17C 2201/0109* (2013.01); *F17C 2201/056* (2013.01);
(Continued)

(58) Field of Classification Search
CPC .......... F17C 2205/03; F17C 2205/0302; F17C 2205/0305; F17C 1/16; F17C 2201/0109;
(Continued)

(56) References Cited

U.S. PATENT DOCUMENTS 5,798,156 A 8/1998 Mitlitsky et al.
2011/0220659 A1 * 9/2011 Strack ....................... F17C 1/16 220/586
(Continued)

FOREIGN PATENT DOCUMENTS

CN 110220106 A * 9/2019 .............. F17C 13/06
DE 102011010685 A1 8/2011
(Continued)

OTHER PUBLICATIONS

English Machine Translation of CN-110220106-A (Year: 2019).*
English Machine Translation of WO-2017200206-A1 (Year: 2017).*

*Primary Examiner* — Laura E. Parker
(74) *Attorney, Agent, or Firm* — Laurence A. Greenberg; Werner H. Stemer; Ralph E. Locher

(57) ABSTRACT

A boss for a pressure tank for storing gas in a gas-powered vehicle. The boss is configured for attachment to a wall of the pressure tank enclosing a cavity for storing the gas. The wall has a reinforcement layer made of fiber-reinforced plastic and an inner liner for sealing. The boss has an external thread, which can be connected to a mating internal thread of the liner. There is also described a pressure tank with two such bosses.

17 Claims, 3 Drawing Sheets

(52) U.S. Cl.
CPC .................. *F17C 2203/012* (2013.01); *F17C 2203/0604* (2013.01); *F17C 2203/0619* (2013.01); *F17C 2203/0673* (2013.01); *F17C 2205/0305* (2013.01); *F17C 2270/0168* (2013.01)

(58) Field of Classification Search
CPC .......... F17C 2201/056; F17C 2203/012; F17C 2203/0604; F17C 2203/0619; F17C 2203/0673; F17C 2270/0168
USPC .......................................................... 220/590
See application file for complete search history.

(56) References Cited

U.S. PATENT DOCUMENTS

| | | | | |
|---|---|---|---|---|
| 2011/0220661 | A1* | 9/2011 | Strack | F17C 13/002<br>220/601 |
| 2016/0025266 | A1* | 1/2016 | Leavitt | F17C 1/16<br>206/0.6 |
| 2017/0175950 | A1* | 6/2017 | Chung | F17C 1/00 |
| 2018/0340653 | A1* | 11/2018 | Moutray | F17C 1/06 |

FOREIGN PATENT DOCUMENTS

| | | | | |
|---|---|---|---|---|
| DE | 102018009829 | A1 | 6/2020 | |
| EP | 0550951 | A1 | 7/1993 | |
| EP | 2115343 | A1 | 11/2009 | |
| WO | 2011103687 | A1 | 9/2011 | |
| WO | 2016018679 | A1 | 2/2016 | |
| WO | WO-2017200206 | A1 * | 11/2017 | F17C 1/02 |
| WO | 2018217529 | A1 | 11/2018 | |

* cited by examiner

CAP FOR A PRESSURE TANK, AND PRESSURE TANK FOR A GAS-POWERED VEHICLE

FIELD AND BACKGROUND OF THE INVENTION

The invention relates to a pressure tank for storing gas for being mounted in a gas-operated vehicle, wherein the pressure tank has a circularly symmetrical elongate form which is cylindrical in the central region and which is terminated at both ends by domed end caps. The pressure tank has a wall which encloses a cavity for storage of the gas, and also has a metallic connection piece, a so-called boss, at each of the end caps, wherein the wall comprises a reinforcement layer composed of fiber-reinforced plastic and an inner liner for sealing.

The invention furthermore relates to a boss for such a pressure tank.

Gas-operated vehicles have for example a gas engine or a fuel cell with an electric motor as a drive. In order to be able to store fuel to a sufficient extent, the gas, which may be inter alia hydrogen, is stored at high pressure in the tank. Pressures of above 200 bar, frequently up to 600 bar and sometimes even up to 700 or 875 bar are typical for such pressure tanks. This means that not only does the pressure tank have to be gas-tight at this pressure but also it requires a high level of mechanical stability.

Pressure tanks for gas-operated vehicles are known in the prior art. These pressure tanks have a wall which, for sealing off an inner liner, for example composed of thermoplastic, and, for providing the mechanical stability, comprises a reinforcement layer composed of fiber-reinforced plastic. The reinforcement layer is preferably wound and designed as a CFRP layer. CFRP stands for carbon-fiber-reinforced plastic.

The boss has a passage bore and a connection thread. At at least one of the two bosses, there is connected a tank fitting which allows the pressure tank to be filled or gas to be extracted in a controlled manner. At the other boss, the passage opening is sealed off by a closure means or provision is made there of a further tank fitting or a safety valve.

With such pressure tanks, particular attention has to be paid to the attachment between the metallic connection piece, the boss, and the liner, since here large forces occur during production and later, during operation, high demands are placed on tightness—moreover with mechanical load, varying internal pressure and large temperature variations. In particular in the case of large hydrogen pressure tanks with a total mass of above 150 kg, this is a major challenge.

There are various known solutions in the prior art for the connection between the boss and the liner. In this regard, it is possible for example, as described in EP 550951 A1, for a form-fitting connection between liner (referred to as inner liner) and boss (referred to as annular flange) to be used. Such form-fitting connections, such as for example dovetail connections, are however producible at present only if the end caps of the liner are produced in an injection-molding process or a similar process.

It would be advantageous if form-fitting connections could also be produced in a process other than an injection-molding process.

A further known possibility has been disclosed in DE 102011010685 A1, in WO 2011/103687 A1 and in EP 2115343 A1. In said documents, the boss (referred to as main body or metal body) is screwed onto the liner collar (referred to as inner container or core container). For this purpose, the boss has an internal thread. The sealing is ensured by way of a metal cylinder bearing O-ring seals that is screwed into the boss. The liner is consequently clamped between the boss, at the outside, and the metal cylinder, at the inside. The boss is then wrapped on the outer side with the reinforcement layer composed of CFRP.

These known embodiments have the disadvantage that, during the production of the reinforcement layer, they give rise to difficulties, in particular in the case of relatively large pressure tanks, as are necessary for example for utility vehicles, which are to be driven by a fuel cell, the boss not being sufficiently fixed. Such novel pressure tanks for utility vehicles may reach diameters of up to 600 mm and lengths of 2500 mm. The reinforcement layer is normally produced in a winding process. For this purpose, the liner, which is already connected as a preliminary product to the boss, is clamped into a winding machine and set in rotation. The torque is introduced into the liner via the boss(es). In this case, the liner is wrapped with fiber tapes or fiber rovings, wherein, for process-related reasons, large tensile forces act tangentially on the liner due to the draw-off tension of the roving or fiber tapes. Consequently, during the wrapping process, large torque forces act on the connection between boss and liner. Since the lever arm increases with the diameter of the pressure tank and relatively large pressure tanks are simultaneous wrapped with multiple rovings, the load is correspondingly relatively large in the case of relatively large pressure tanks. These increased forces are not withstood by the hitherto known embodiments of the connection. If the connection between liner and boss is damaged, this can lead to mechanical failure or to leakage.

SUMMARY OF THE INVENTION

The object of the invention, then, is to develop a pressure tank, or a boss for a pressure tank, which has a better connection between liner and boss such that even novel larger pressure tanks are simple and reliable to produce.

The object is achieved firstly by a boss as claimed. Further advantageous features are specified in the respective dependent claims.

According to the invention, the boss as claimed is distinguished in that the boss has an external thread which can be connected to a matching internal thread of the liner and which is arranged concentrically in relation to its longitudinal axis L. The use of an external thread on the boss for connection allows the diameter of this boss/liner connection to be increased, and thus the load capacity thereof to be increased, without the diameter of the passage bore of the boss having to be increased. This increase in thread diameter at the external thread makes it possible for the connection to transmit larger torques.

Furthermore, the external thread on the boss and the consequently good connection between boss and liner makes provision for the liner to be force-free at the sealing surface between liner and boss. This is possible because the external thread is radially further away from the longitudinal axis t than the sealing surface and thus keeps any torque load away from the sealing surface situated further inward. In addition, due to the increased diameter at the connection between boss and liner, it is moreover also possible for the sealing surface, situated further inward, between boss and liner to be enlarged and configured to have better sealing action.

A particularly good connection with a simultaneously space-saving and thus weight-saving embodiment is obtained if the external thread has at least 4 to at most 10 thread turns. A groove encircling once at the circumference and composed of thread elevation with adjacent thread depression is considered here as being a thread turn.

In a particularly advantageous embodiment, the external thread is designed as a cylindrical thread and has a diameter based on the tips of the thread elevations of at least 60 mm, preferably of at least 90 mm, and at most of 180 mm. In this way, a sufficiently good load capacity of the connection for the later winding process is ensured and also a weight of the boss that is not excessively high is simultaneously made possible.

Furthermore, it is advantageous if the external thread has at one end at least one half thread turn with a thread elevation which is smaller than the other thread elevations, and has at the other end at least one half thread turn, preferably at least one whole thread turn, with a thread depression which is smaller than the other thread depressions. In particular, the height of the thread elevations runs out linearly toward one end of the thread. That is to say that the thread elevation is continuously reduced toward the end. Also, in particular, the depth of the thread depressions runs out linearly toward the other end of the thread. That is to say that the thread depression is continuously reduced toward the end. The thread pitch can be adapted locally to the thread elevation or thread depression.

Particularly preferably, the thread turn with the smaller thread elevation is situated on the end which faces toward the cavity and the thread turn with the smaller thread depression is situated on the end which faces toward the reinforcement layer. The internal thread in the liner is correspondingly of identical but inverted design.

Such a specific thread provides a form fit between boss and liner and increases the stability of the connection. If the boss is screwed into the liner, then, due to the changed half or whole thread turn at the respective end of the thread, the rotational position of boss in relation to liner can be defined in a reproducibly accurate manner. In this way, the external thread on the boss, in the screwed-in state, is exactly filled by the internal thread of the liner and a connection with a high load capacity is thus achieved. Moreover, even in the case of relatively small manufacturing inaccuracies and the boss thus not being screwed in completely, no relatively large gaps remain in the thread between boss and liner since the respective thread depressions at the end of the thread have a relatively small volume. This is advantageous since, in the case of relatively large gaps in the connection, due to the enormous internal pressure, otherwise large shear forces can act on the liner and damage it.

A preferred possibility for effectively fastening the pressure tank in a vehicle or in a tank module is for the boss to be designed in such a way that the boss comprises a neck region for being accommodated in a holder. The holder encloses the neck region of the boss and can in this way bear the weight of the pressure tank. This offers advantages in comparison with the hitherto conventional fastening of pressure tanks with the aid of tightening straps over the wall of the pressure tank.

In particular, the neck region has a length which is at least 50% of the outer diameter measured at the thinnest point of the neck region, wherein the length is preferably between 40 mm and 80 mm, and wherein particularly preferably the neck region is designed to be of this length with a cylindrical outer contour. In this way, the neck region is long enough for stable accommodation in the holder to be formed.

In a further embodiment according to the invention, the boss moreover has an annular sealing surface which is arranged perpendicularly to the longitudinal axis (L) or which forms an angle of between 70° and 110° with the longitudinal axis (L). The liner can be additionally pushed, for example with the aid of a spring element, against said sealing surface, so that the sealing action is improved yet further.

In particular, the boss may have a screw thread which is designed as an internal thread and via which a sleeve can be screwed in, said sleeve serving for pushing the liner against a sealing surface of the boss with the aid of a spring element.

The object is achieved secondly by a pressure tank as claimed. Further advantageous features are specified in the respective dependent claims.

The pressure tank according to the invention is distinguished in that it comprises two bosses according to the invention. Both bosses are accordingly connected via an external thread to the liner, which has a matching internal thread. Such a pressure tank can be produced in that, for example, firstly a preliminary product is made. The liner is produced from a thermoplastic, in particular from polyamide, for example in a blow-molding process, and then the two bosses are screwed into the liner.

In a further method step, the produced preliminary product made up of liner and boss is wrapped with tapes composed of fiber-reinforced plastic, in particular of CFRP (carbon-fiber-reinforced plastic), for the purpose of forming the reinforcement layer of the pressure tank. The tapes are preferably already impregnated with a suitable plastic resin (so-called tow preg), which is cured after the winding. Such tow pregs result in even greater tensile forces during the winding since, owing to the tough resin, they require larger draw-off forces for being unwound from the supply packages. As a result of the embodiment according to the invention of the bosses, the connection to the liner has a significantly higher load capacity than connections according to the prior art, so that fault-free wrapping without damage to the connection points is at any rate ensured.

Furthermore, it is advantageous if, at one boss, the external thread is designed as a right-hand thread and, at the other boss, the external thread is designed as a left-hand thread, wherein, at each of the sides, the liner has a correspondingly matching internal thread. In this way, both boss/liner connections can accommodate relatively large rotational forces in a common direction of rotation and are thus better protected against unscrewing during the winding process. Thus, in this embodiment, the drive during the winding process can be realized via both bosses.

Alternatively, the two bosses may also be designed with an external thread which extends in the same direction (both having right-hand threads or both having left-hand threads). In this way, torque forces can be accommodated at the preliminary product and at the pressure tank in both directions of rotation in that in each case one of the bosses accommodates the torque.

Preferably, the internal threads, matching the external thread, of the liner are produced in the liner by cutting. This allows an exactly matching internal thread to be made, which increases the tightness and the load capacity of the connection. Moreover, the risk of crack formation during the screwing-in of the bosses is reduced since the external thread does not have to cut into the surface of the liner.

The sealing between liner and boss can be improved if, for sealing, a sleeve connected to the boss, a pressure ring and a spring element are provided and are configured in such a way that the spring element is supported against the sleeve and pushes the pressure ring against the liner and, in this way, the latter against a sealing surface of the boss.

In a preferred variant, the sleeve is fastened to the boss via a screw thread, in particular in such a way that the force by which the pressure ring is pushed can be varied via said screw thread. In this regard, the sleeve may have for example an external thread which engages into an internal thread on the boss. As a result of the variable screwing-in depth of the sleeve in the boss, the spring between sleeve and pressure ring can be compressed with different intensities. The preload can thus be set in a targeted manner.

Alternatively, the sleeve may be fastened to the boss via a clamping means. In this case, the clamping means must be designed in such a way that it cannot be released by the spring force.

The sleeve connected to the boss, the pressure ring and the spring element May during the production of the liner in a blow-molding process, be arranged on the so-called blow pin. During the blow-molding process, the plastic for the liner is extruded from a nozzle, so that first of all a hose is formed. Then two or more parts of the blow-molding tool are brought together such that a cavity in the shape of the liner to be formed for the pressure tank is formed. The extruded hose is situated in said cavity. Via the so-called blow pin, a mouthpiece, gas is injected into the hose, whereby said hose comes to lie against the inner side of the blow-molding tool. In this way, the liner acquires the desired form. After the plastic material has solidified, the liner can be demolded. The blow pin is removed. Preferably, the liner is produced from a thermoplastic material, for example from polyamide. Thermoplastic material solidifies after cooling. In this way, it is possible for the pressure ring and the spring element to be situated on the inner side of the liner after the production of the liner, wherein the spring element can be supported against the sleeve and can push the pressure ring against the liner and the latter against a surface of a boss when the sleeve is connected at a later stage to the boss.

A significant advantage of this embodiment is that, owing to the spring element and owing to the two-part embodiment with sleeve and pressure ring, a preload for sealing can be applied to the sealing surface between liner and boss. The sealing surface is situated in the region in which the liner is pushed against the boss. Owing to the preload generated in this way, sufficient tightness is provided at all times, for example even in the case of low internal pressure or in the case of expansions due to temperature differences. A matched setting of the spring force moreover allows over-pressing of the liner and thus deformation, which leads to leakage, to be avoided.

A spring element is to be understood here as meaning an element which, when compressed, is able to apply an adequate elastic spring force. For example, said spring element may be designed as an annular element composed of spring steel that has so-called spring wings, and in particular the spring element may have a U-shaped or V-shaped cross section. Alternatively, the spring element may also be formed from multiple leaf springs or spiral springs arranged between sleeve and pressure ring. Other types and shapes of springs may also be used here. As further spring materials, use may be made for example of elastic polymers (elastomers or crosslinked thermoplastics) or spring elements composed of fiber-composite plastics.

In order to permanently ensure the function, it is advantageous if, together with the sleeve, the pressure ring fully encloses the spring element. In this way, the spring element is protected and remains in the desired position. Moreover, this embodiment also offers simple assembly. These advantages have a positive effect inter alia even when the liner is being made in a blow-molding process. Fully enclose also covers in this context the case in which individual openings or gaps are present. Complete encapsulation is not necessary.

In order that the preload is well built up and good sealing is obtained, the pressure ring is displaceable in the direction of the longitudinal axis L in relation to the sleeve. The pressure ring can thus be of such a stiff design that uniform pressing via the sealing surface and thus reliable sealing is achieved.

Preferably, the sleeve is arranged in such a way that it has no areal contact with the liner. The pressing for sealing is transmitted solely via the surface of the pressure ring.

Further advantageous features of the invention will be discussed on the basis of exemplary embodiments with reference to the drawings. The stated features May be advantageously realized not only in the illustrated combination but may also be individually combined with one another. In the figures, specifically:

DETAILED DESCRIPTION OF THE INVENTION

The figures will be described in more detail below. The same reference signs are used to denote identical or analogous parts or components.

Figure 1:
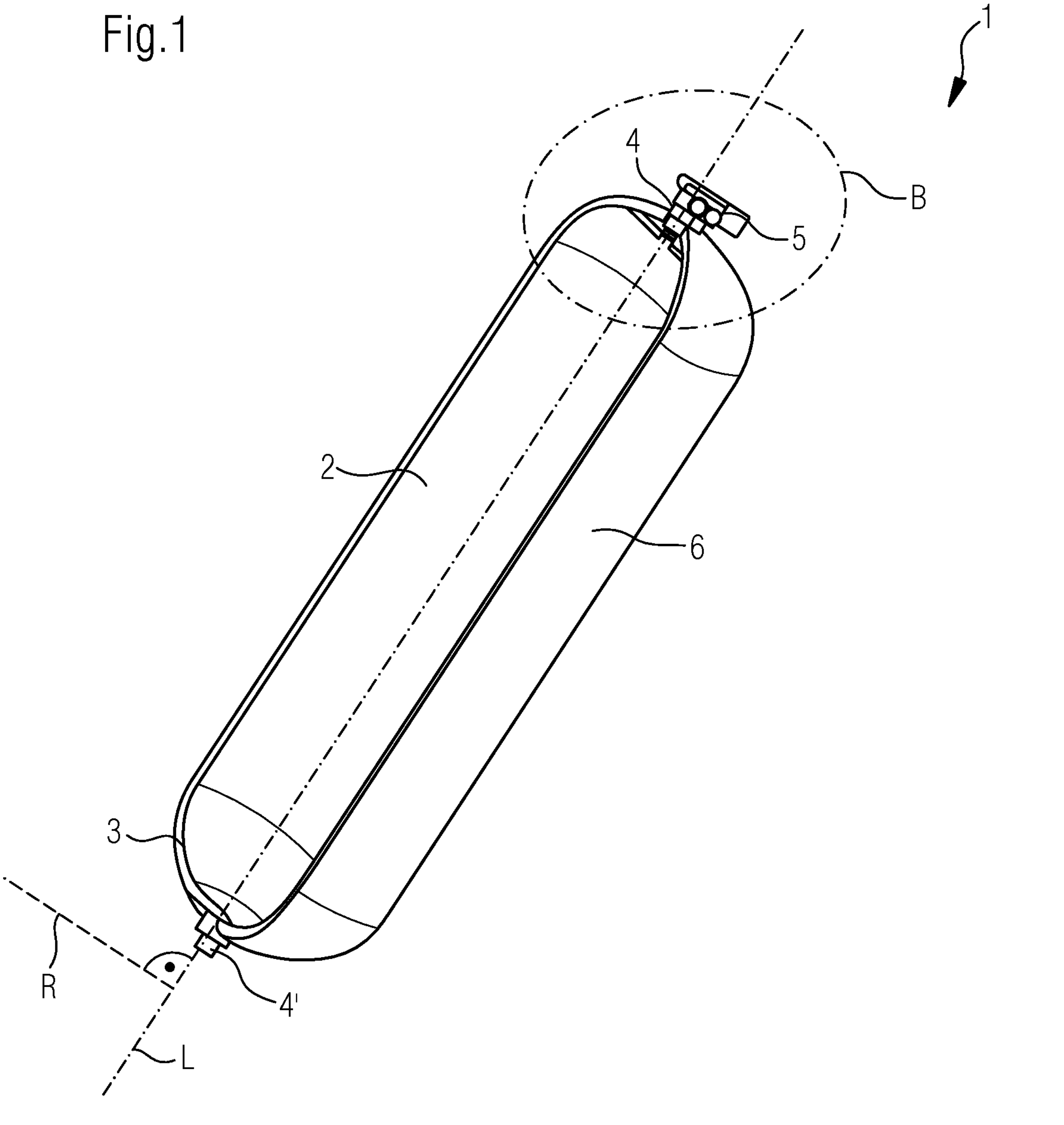
FIG. 1 shows a schematic illustration of a pressure tank according to the invention

FIG. 1 shows the pressure tank 1 with in each case one boss 4, 4' on the two end caps. A tank fitting 5 for filling and for controlled extraction of gas is screwed into the boss 4. The boss 4' is sealed off by way of a closure means. Alternatively, it may accommodate a safety valve. The wall of the pressure tank 1 encloses the cavity 2 and is formed by an inner liner 3 and a reinforcement layer 6. The liner 3 is preferably composed of thermoplastic material, such as for example polyamide, and is produced in a blow-molding process in methods according to the invention. The reinforcement layer 6 is produced by way of a winding process with tapes composed of fiber-reinforced plastic, preferably of CFRP. The pressure tank 1 is circularly symmetrical about the longitudinal axis L. With such pressure tanks, particular attention has to be paid to the sealing and the connection between boss 4, 4' and liner 3. In particular with large pressure tanks, as are required in utility vehicles, in order to allow a sufficient range, a good connection between boss and liner is a major challenge. According to the invention, the bosses 4, 4' are screwed to the liner 3 via an external thread. Preferably, one boss 4 has a right-hand thread and the other boss 4' has a left-hand thread.

Figure 2:
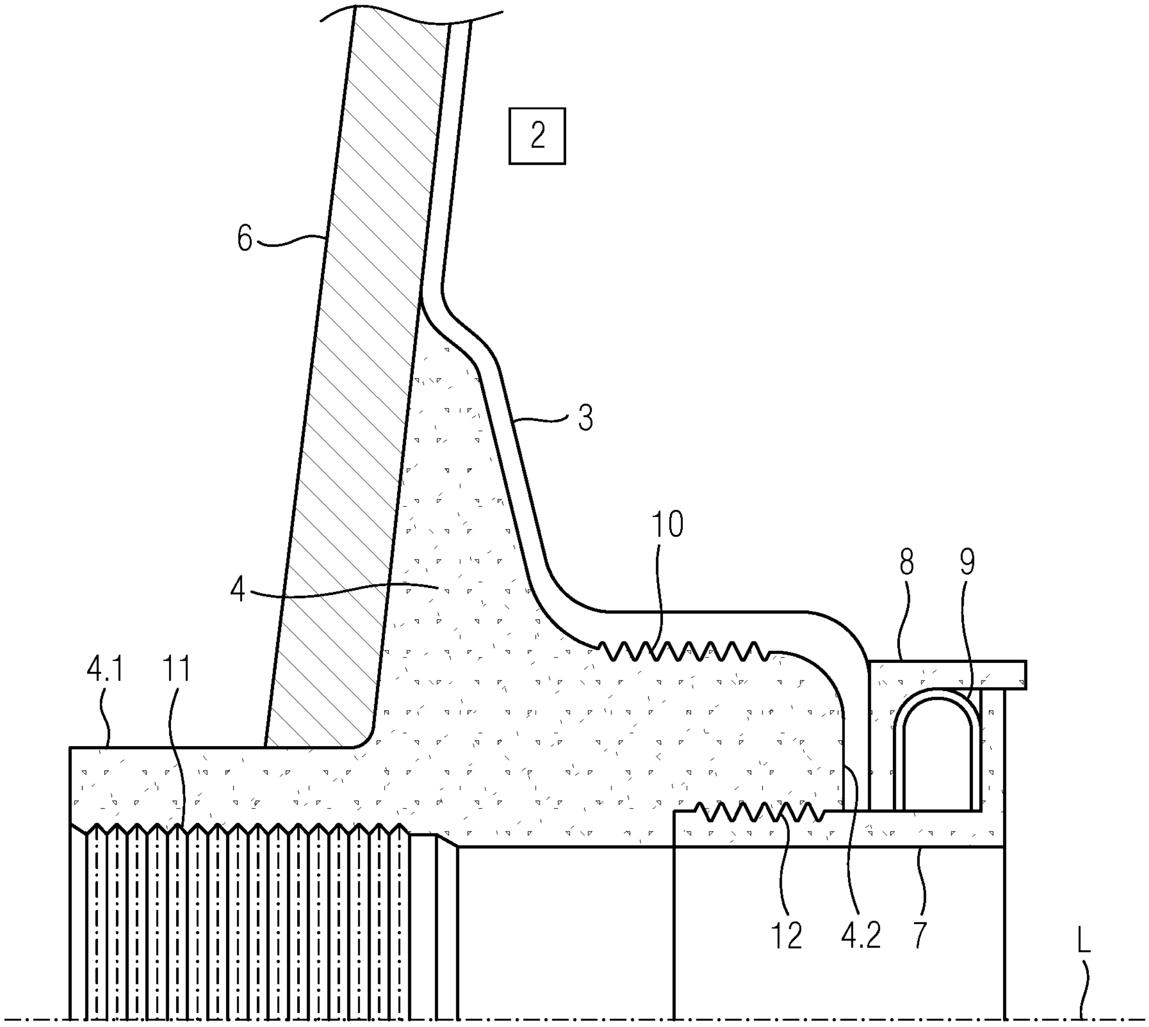
FIG. 2 shows a detail of the attachment between boss and wall in an embodiment according to the invention

FIG. 2 shows an enlargement of the detail B of the pressure tank 1, such that the embodiment according to the invention for improved connection between boss and liner is made visible. The boss 4 has the external thread 10. The liner 3 has a matching internal thread. Preferably, the latter is produced by cutting after the liner 3 has, for example in a blow-molding process, been produced. Owing to the relatively large diameter of the external thread 10, the connection can withstand relatively large loads. Fault-free wrapping with the tapes for the reinforcement layer 6 is thus possible.

In addition, the boss has the sealing surface 4.2. The pressure ring 8 and the spring element 9 are situated in the interior of the liner 3, that is to say in the cavity 2. Via the sleeve 7, which is connected to the boss 4, the spring element 9 is preloaded and pushes the pressure ring 8 against the liner 3 and thus the liner 3 against the boss 4. The connection between the boss 4 and the sleeve 7 is produced via the screw thread 12, wherein a corresponding external thread is on the sleeve 7. Sleeve 7 and liner 3 do not make contact in an areal manner, there being some resultant contact only at the end surface of the liner 3. The pressing of the liner 3 against the sealing surface 4.2 of the boss is realized solely via the pressure ring 8. Said pressure ring 8 is movable in relation to the sleeve 7 and can be displaced in the direction of the longitudinal axis L. Together, they enclose the spring element 9, which in this way is well-protected. Moreover, the components can in this way be fitted well. For this purpose, use is made of a special tool which can be introduced through the passage bore of the boss 4.

That surface of the pressure ring 8 which is pressed against the liner 3 and that surface of the liner 3 which is pressed against the boss 4 are oriented substantially perpendicularly to the longitudinal axis L. Likewise, the collar of the sleeve 7, against which the spring element 9 is supported, is arranged substantially perpendicularly to the longitudinal axis L. Thus, by way of the screw connection 12, the spring force of the spring element 9 is transmitted completely via the pressure ring 8 to the sealing surface between the boss 4 and the liner 3. A sufficient transmission of force can still be achieved as a result of an inclined position of these surfaces, in particular of the sealing surface 4.2, of at most +/−20°. The inclined position of the sealing surface 4.2 moreover contributes to better venting of the sealing collar during the manufacture of the liner. The inclined position allows better escape of the air from the pinch point when the tool halves are moved together.

That region of the boss 4 in which the pressure ring 8 pushes the liner 3 against the boss 4 is referred to as sealing surface 4.2 or throttle point. The sealing and thus the throttling of the gas internal pressure in the pressure tank is realized by the pressing of the liner 3 against the boss 4 owing to the spring force of the spring element 9 and owing to the gas internal pressure itself.

On the side against which the spring element 9 bears, the pressure ring 8 is preferably shaped in such a way that use is made of the largest possible contact surface for transmission of force. In this case, the pressure ring 8 has a curved shape that corresponds to the curve of the spring element with U-shaped cross section.

For the embodiment according to the invention, spring elements other than that shown here in the example may also be used.

Furthermore, provision is made on the boss 4 of the internal thread 11, via which for example a tank fitting, a safety valve or a closure means can be screwed in. Moreover, the boss has the neck region 4.1, which is suitable for being accommodated in a holder in order for the pressure tank to be fastened in a vehicle.

The solution according to the invention with the external thread 10 on the boss for reliable and stable connection to the liner 3 may also be used in embodiments of the boss other than that embodiment thereof illustrated here. In this regard, for example, it is possible for the sealing between liner 3 and boss 4 at the sealing surface 4.2 to be improved by further measures, or it is possible for the sealing to be realized in a different manner than with the illustrated pressure ring 8.

Figure 3:
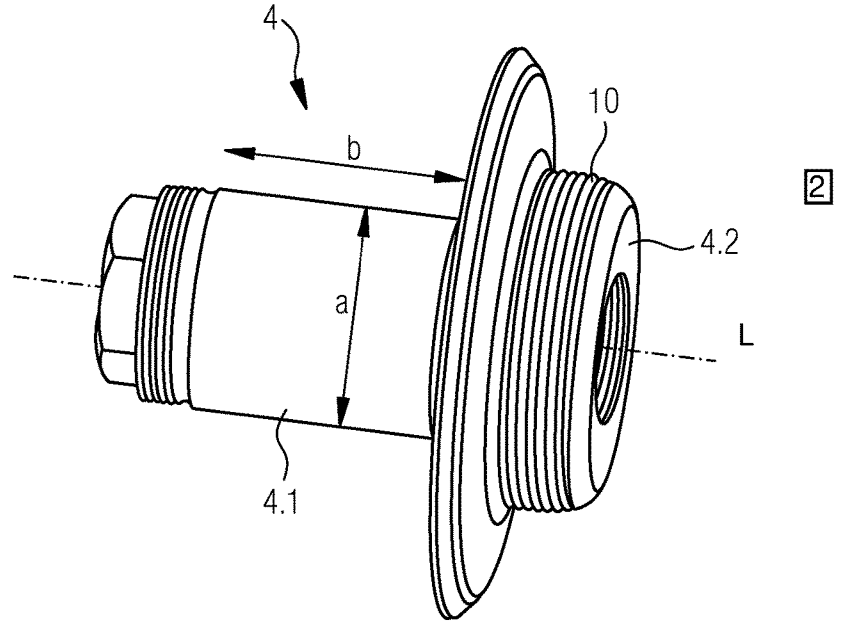
FIG. 3 shows a boss according to the invention with an external thread

FIG. 3 illustrates an embodiment according to the invention of the boss 4, having the outer thread 10 for connection to a liner, having the sealing surface 4.2 and having the neck region 4.1. Situated between the neck region 4.1 and the external thread 10 is a collar which, at a later stage, is wrapped with the tapes for the reinforcement layer and which, in the finished pressure tank, is arranged between reinforcement layer and liner. Preferably, the external thread 10 is a cylindrical thread. The diameter of the external thread 10 is preferably between 60 mm and 180 mm.

The sealing surface 4.2 is provided for the liner to be pushed thereagainst by suitable devices and for a throttle point providing sealing action with respect to the internal pressure to thus be formed.

In addition, annular elevations of a few tenths of a millimeter in height may be provided on the sealing surface 4.2. Said elevations are pushed into the adjoining liner and thereby provided for better sealing.

Moreover, the boss has the neck region 4.1, which is suitable for being accommodated in a holder in order for the pressure tank to be fastened in a vehicle. Preferably, the neck region is formed with a cylindrical outer contour and has at least a length b of at least 50% of its outer diameter a.

Figure 4:
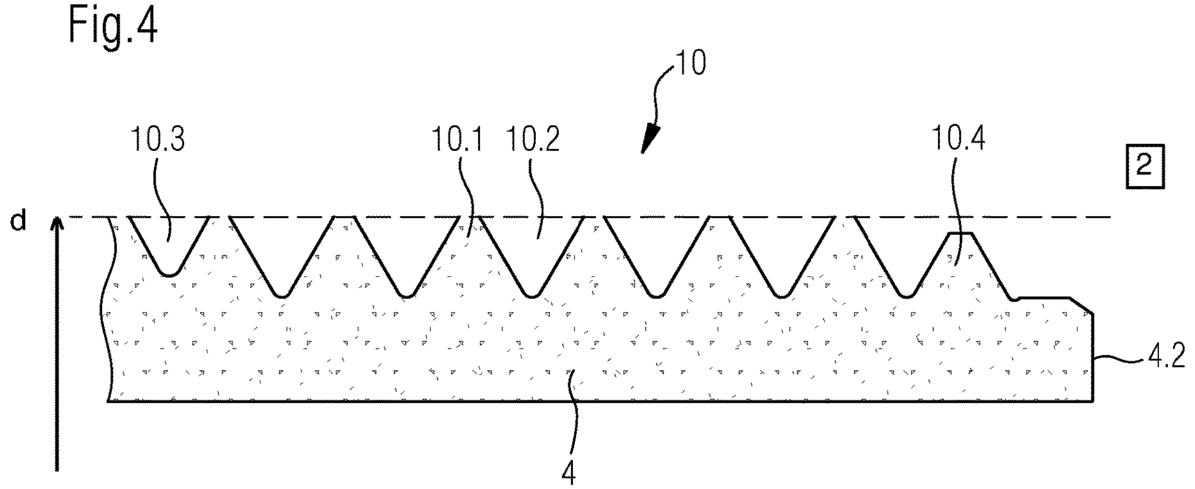
FIG. 4 shows a schematic illustration of a specific external thread of a boss according to the invention

FIG. 4 shows a specific outer thread 10 according to the invention of the boss 4 in a sectional illustration. The thread elevations 10.1 extend as far as the outer diameter d and, apart from the thread elevation 10.4, have the same height. Also, the thread depressions 10.2, apart from the thread depression 10.3, have the same depth. A thread turn is formed in each case by a once-encircling groove composed of thread elevation 10.1 and thread depression 10.2. The external thread 10 illustrated here has 7 thread turns.

A half thread turn or a whole thread turn at one end of the external thread has a thread elevation 10.4 with a reduced height. In particular, the height of the respective thread elevations can decrease linearly toward this end of the external thread. This end faces toward the cavity 2 of the pressure tank.

At the other end of the external thread, which faces toward the reinforcement layer or the aforementioned collar of the boss 4, there is arranged a half thread turn or a whole thread turn that has the thread depression 10.3 with a reduced depth. In particular, the thread depressions may be configured so as to decrease linearly toward this end of the external thread.

Owing to the specific embodiment of the thread, a liner with a matching mating thread can be screwed on in such a way that the rotational positioning is exactly predefined, which offers the aforementioned advantages.

LIST OF REFERENCE SIGNS

1 Pressure tank
2 Cavity
3 Liner
4, 4' Boss
4.1 Neck region
4.2 Sealing surface
5 Tank fitting
6 Reinforcement layer
7 Sleeve
8 Pressure ring
9 Spring element

10 External thread
10.1 Thread elevation
10.2 Thread depression
10.3 Thread depression
10.4 Thread elevation
11 Internal thread
12 Screw thread
a Outer diameter of the neck region
b Length of the neck region
d Diameter of the external thread
L Longitudinal axis of the pressure tank and boss
R Radial direction of the pressure tank and boss

The invention claimed is:

1. A boss for a pressure tank for storing gas in a gas-operated vehicle, wherein the pressure tank has a wall that encloses a cavity for storing the gas, and the wall includes a reinforcement layer composed of fiber-reinforced plastic and an inner liner for sealing the pressure tank;

the boss comprising:

an external thread for attachment to the wall of the pressure tank, said external thread being configured for meshing with a matching internal thread of the liner and to be arranged concentrically in relation to a longitudinal axis of the pressure tank; and an annular sealing surface situated on an end face of the boss, arranged perpendicularly to the longitudinal axis or enclosing an angle of between 70° and 110° with the longitudinal axis, said sealing surface configured for the liner to be pushed thereagainst by a spring element to form a throttle point and provide a sealing action; and a screw thread being an internal thread for receiving a sleeve to be screwed in, the sleeve serving to allow the liner to be pushed against the sealing surface of the boss with the aid of the spring element.

2. The boss according to claim 1, wherein said external thread has at least 4 to at most 10 thread turns.

3. The boss according to claim 1, wherein said external thread has one end formed with at least one half thread turn with a thread elevation which is smaller than remaining thread elevations, and another end formed with at least one half thread turn with a thread depression which is smaller than remaining thread depressions.

4. The boss according to claim 1, wherein the boss is formed with a neck region to be received in a holder, said neck region having a length which is at least 50% of an outer diameter measured at a thinnest point of said neck region.

5. The boss according to claim 4, wherein said neck region length is between 40 mm and 80 mm, and said neck region includes a cylindrical outer contour within said neck region length.

6. The boss according to claim 1, wherein said external thread is a cylindrical thread, and a diameter of the external thread based on tips of the thread elevations is at least 60 mm and at most 180 mm.

7. The boss according to claim 6, wherein the diameter of the external thread is between 90 mm and 180 mm.

8. The boss according to claim 1, wherein the annular sealing surface encloses an angle of between 70° and 110° with the longitudinal axis.

9. The boss according to claim 1, wherein the external thread is radially further away from the longitudinal axis than the sealing surface to keep a torque load away from the sealing surface situated further inward.

10. The boss according to claim 1, wherein said sealing surface includes annular elevations configured to be pushed into the liner.

11. The boss according to claim 10, wherein each annular elevation is a few tenths of a millimeter in height.

12. A pressure tank for storing gas in a gas-operated vehicle, the pressure tank comprising:

a wall defining a circularly symmetrical elongate form which is cylindrical in a central region and is terminated at both ends by domed end caps;

said wall enclosing a cavity for storing the gas, and said wall being formed of a reinforcement layer composed of fiber-reinforced plastic and an inner liner for sealing the cavity;

each of said domed end caps having a metallic connection piece, being a boss;

each boss including:

an external thread for attachment to the wall of the pressure tank, said external thread being configured for meshing with a matching internal thread of said liner and to be arranged concentrically in relation to a longitudinal axis of the pressure tank;

an annular sealing surface situated on an end face of the boss outside said liner and configured for said liner to be pushed thereagainst to form a throttle point and provide a sealing action; and a spring element associated with each boss, said liner being pushed against said sealing surface of a respective boss by an associated spring element.

13. The pressure tank according to claim 12, wherein said external thread of said boss at one end being a right-hand thread and said external thread of said boss at an opposite end being a left-hand thread.

14. The pressure tank according to claim 12, wherein said internal threads are produced in said liner by cutting.

15. The pressure tank according to claim 12, further comprising, for each of said domed end caps, a sleeve connected to a respective boss and a pressure ring, wherein said spring element is supported against said sleeve to push said pressure ring against said liner, to press said liner against said sealing surface of said respective boss.

16. The pressure tank according to claim 15, wherein said pressure ring together with said sleeve fully enclose said spring element.

17. The pressure tank according to claim 15, wherein said pressure ring is displaceable relative to said sleeve in a direction of a longitudinal axis L of the pressure tank.

* * * * *